Oct. 21, 1969     L. JOHANSON     3,474,215
ALIGNMENT-ADJUSTABLE ELECTRODE CHUCK
Filed April 27, 1966     3 Sheets-Sheet 1
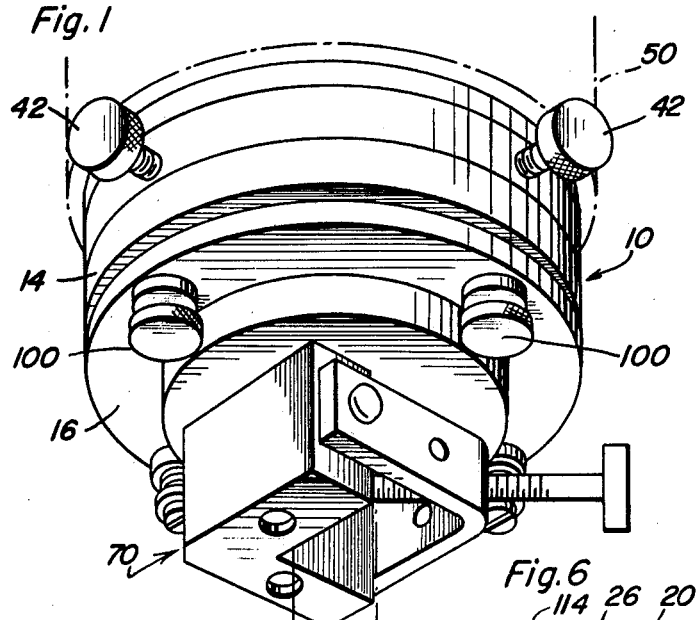
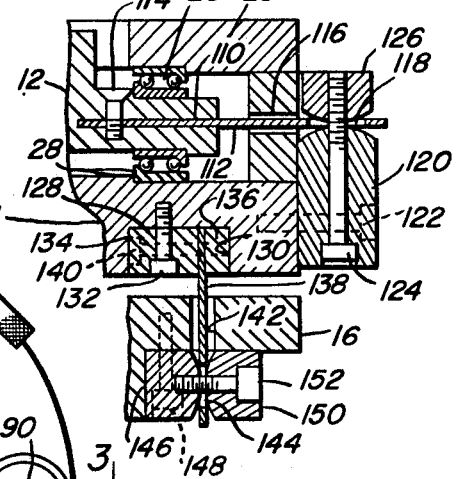
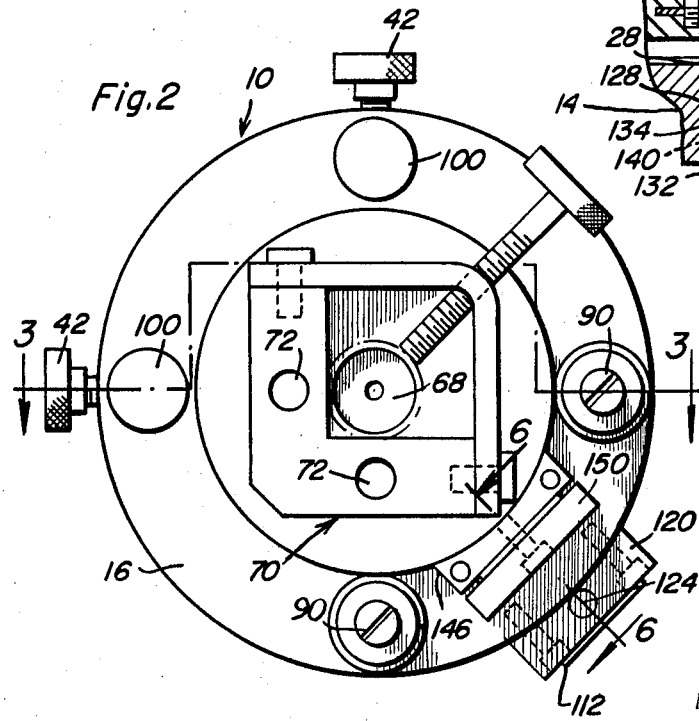
Lars Johanson
INVENTOR.
BY Clarence A. O'Brien
and Harvey B. Jacobson
Attorneys

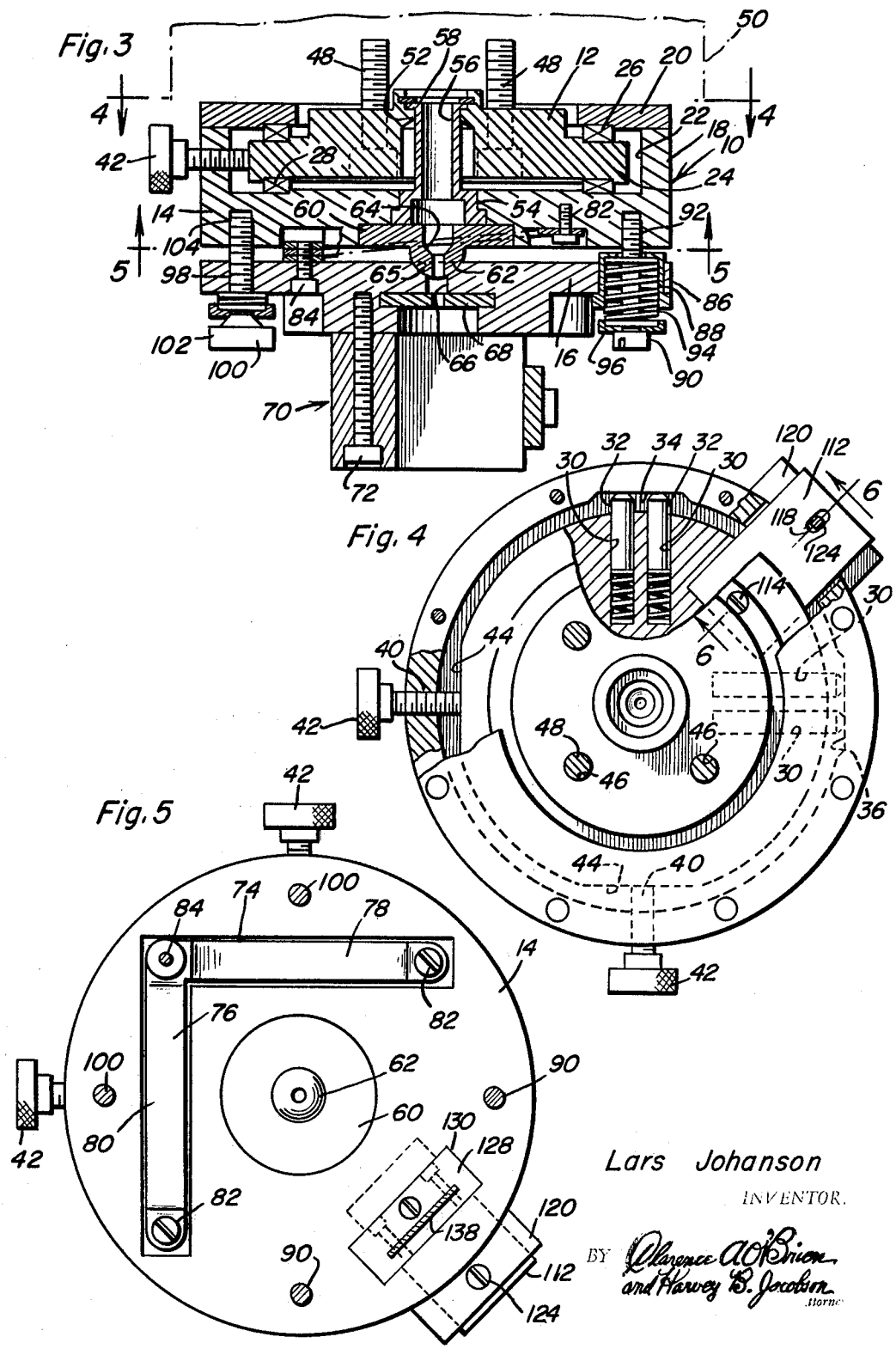

Oct. 21, 1969   L. JOHANSON   3,474,215
ALIGNMENT-ADJUSTABLE ELECTRODE CHUCK
Filed April 27, 1966   3 Sheets-Sheet 3
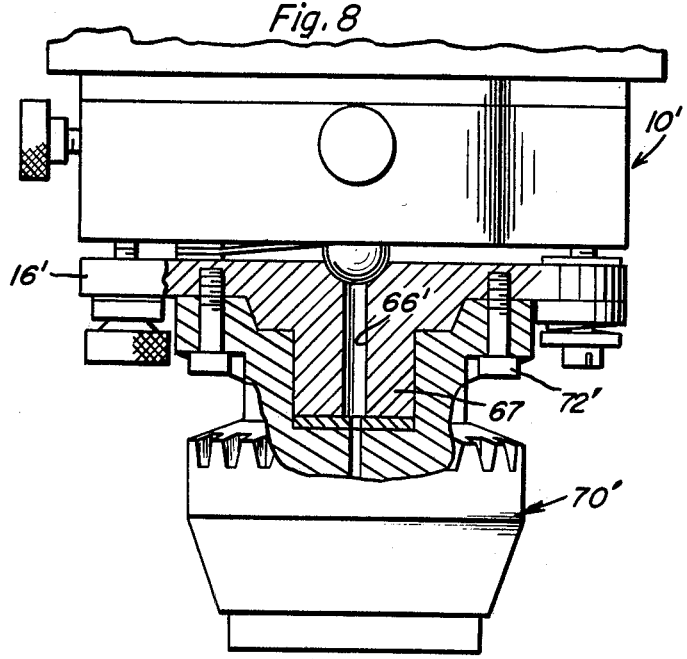
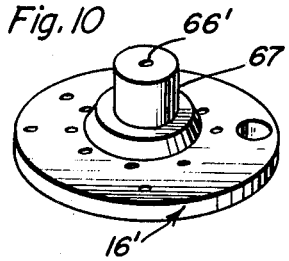
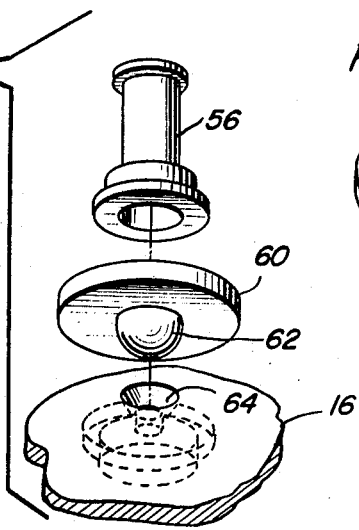
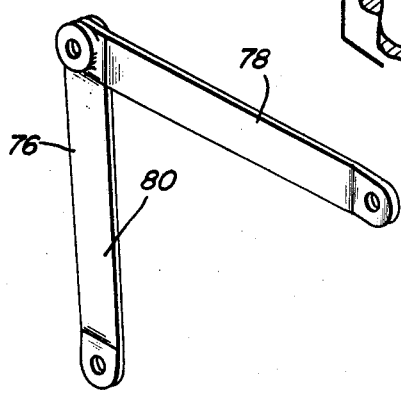
Lars Johanson
INVENTOR.
BY *Clarence A. O'Brien*
and *Harvey B. Jacobson*

United States Patent Office
3,474,215
Patented Oct. 21, 1969

3,474,215
ALIGNMENT-ADJUSTABLE ELECTRODE CHUCK
Lars Johanson, % Eltee, Inc., 19 Fairfield Place, West Caldwell, N.J. 07007
Filed Apr. 27, 1966, Ser. No. 545,722
Int. Cl. B23k 9/16; B23p 1/00
U.S. Cl. 219—69    12 Claims

ABSTRACT OF THE DISCLOSURE

An electro-erosion type electrode is adjustably positioned by slidable displacement of a slide adjustment plate parallel to a pivot plane that is perpendicular to the electrode feed axis. The electrode is carried by a swivel plate pivotally displaceable to an adjusted tilt position relative to the pivot point carried by the slide plate. Coolant is conducted by a flexible tube to the electrode from the mounting plate and a sealed passage in the swivel plate.

This invention relates to a novel and useful electrode chuck or adjustable holding device and more specifically to an adjustable electrode positioning device designed primarily for use with electrical discharge machines.

When using an electrical discharge machine, holes or cavities of substantially any configuration can be machined merely by using an arc producing electrode. An arc is produced between the end of the electrode and the workpiece so as to burn away the metal of the workpiece at a controlled rate. To control sizes and locations, it is necessary to adjust the electrode for squareness and also to adjust the electrode in the center of the spindle of the machine.

The electrode chuck of the instant invention is adapted for securement to an electrical discharge machine and includes a first member adapted for securement to the spindle of the machine. A second member is supported from the first member for movement relative thereto along paths disposed at generally right angles to each other and perpendicular to the longitudinal axis of the spindle of the associated electrode machine and means is provided and operatively connected between the first and the second members for retaining the second member in adjusted position relative to the first member. In addition, the electrode chuck of the instant invention includes a third member supported from the second member for universal movement relative thereto about a point located at least closely adjacent the center axis of the associated electrical discharge machine spindle. Further, means is provided and operatively connected between the second and third members of the electrode chuck to retain the third member in adjusted position relative to the second member of the chuck.

The third member of the chuck is provided with means adapted to frictionally grip and support one end of a tubular electrode and the first, second and third members of the chuck include passage means extending therethrough generally along the center axis of the associated electrical discharge machine spindle defining a closed passage extending through the first, second and third members of the electrode chuck. One end of the closed passage includes means adapted for fluid tight sealed engagement with a cooling fluid outlet of the associated electrical discharge machine spindle and the other end of the closed passage includes means adapted for fluid tight sealed engagement with the adjacent end of the tubular electrode supported from the third member of electrode chuck. By this type of construction an electrode which is tubular in configuration may be utilized and cooling fluid such as oil may be passed from the associated electrical discharge machine, through the electrode chuck of the instant invention and also through the tubular electrode supported from the electrode chuck for discharge out of the end of the tubular electrode engaged with the workpiece.

The main object of this invention is to provide an electrode chuck adapted for use in conjunction with an electrical discharge machine and including means by which a tubular electrode may be supported from the electrical discharge machine and have cooling oil passed through the tubular electrode from the electrical discharge machine.

Another object of this invention, in accordance with the immediately preceding object, is to provide an electrode chuck including adjustable features whereby the ultimate axis of rotation of the tubular electrode supported from the chuck may be laterally adjusted and the longitudinal centerline of the tubular electrode may be adjustably inclined about axes disposed at right angles to the base end of the tubular electrode and at right angles to each other.

Still another important object of this invention is to provide an electrode chuck in accordance with the precedeing objects including adjustable features thereof which may be readily and rapidly caused to effect desired adjustments in the lateral shifting of the base end of the associated tubular electrode about transverse axes disposed at 90° relative to each other.

A final object of this invention to be specifically enumerated herein is to provide an electrode chuck in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of electrode chuck constructed in accordance with the present invention;

FIGURE 2 is a bottom plan view of the electrode chuck illustrated in FIGURE 1;

FIGURE 3 is a transverse sectional view taken substantially upon a plane indicated by section line 3—3 of FIGURE 2;

FIGURE 4 is a horizontal sectional view taken substantially upon a plane indicated by section line 4—4 of FIGURE 3 and with parts being broken away to more clearly illustrate the structural and operational details of electrode chuck;

FIGURE 5 is a horizontal sectional view taken substantially on a plane indicated by section line 5—5 of FIGURE 3;

FIGURE 6 is an enlarged fragmentary sectional view taken substantially upon a plane indicated by section line 6—6 of FIGURE 4;

FIGURE 7 is an enlarged perspective view of a generally L-shaped connecting member adapted to connect the relatively universally mounted members of the electrode chuck;

FIGURE 8 is a side elevational view of a modified form of electrode chuck including means adapted to support a standard Jacob's chuck in lieu of the V-block support illustrated attached to the electrode chuck illustrated in FIGURES 1–3;

FIGURE 9 is an exploded perspective view of the portions of the electrode chuck of the instant invention which coacts to form a closed fluid passage through the chuck; and FIGURE 10 is a perspective view of the portion of the chuck illustrated in FIGURE 8 which comprises the modification of the electrode chuck illustrated in FIGURES 1–6.

Referring now more specifically to the drawings, the numeral 10 generally designates the electrode chuck of the instant invention. The chuck 10 includes a first mounting plate member 12, a slide adjustment assembly including a second plate member 14, and a third swivel plate member 16. Each of the members 12, 14 and 16 is generally circular in configuration and it may be seen that the member 14 includes axially extending generally cylindrical wall portion 18 projecting upwardly therefrom to whose upper free edge an annular retaining wall 20 is secured. An annular cavity 22 is formed between the retaining wall 20 and the plate member 14 in which the diametrically largest portion 24 of the member 12 is held captive. Suitable bearings 26 are disposed between the portion 24 and the retaining wall 20 and additional bearings 28 are disposed between the portion 24 and the plate member 14. In this manner the second plate member 14 is supported from the first plate member 12 for radial movement relative to the latter.

The portion 24 is provided with two pairs of generally radial aligned bores 30 in which spring urged rods 32 are disposed. Two pairs of bores 30 are disposed at 90° relative to each other and the radial outermost ends of the rods 32 bear against flat end walls 34 of recesses 36 provided for the rods 32 in the cylindrical wall portions 18. In addition, portions of the cylindrical wall portions 18, opposite the pairs of bores 30, are provided with threaded radial bores 40 in which planar abutment screws 42 are threadedly engaged, the inner ends of which screws abut against flat portions 44 formed in the periphery of the portion 24 of the plate member 12 in registry with the bores 40.

The plate member 12 is provided with a plurality of bores 46 spaced circumferentially thereabout through which suitable fasteners 48 are secured for threaded engagement with the spindle 50 of an associated electrical discharge machine.

The members 12 and 14 have central openings 52 and 54 formed therethrough and the opposite ends of a flexible tubular member 56 are secured in the openings 52 and 54 in fluid-tight sealed engagement with the plate members 14 and 16. The end of the tubular member 56 secured in the plate member 12 includes an end portion 58 adapted for fluid tight sealed engagement with a cooling oil outlet in the spindle 50 and the end of the tubular member 56 secured in the plate member 14 is disposed in fluid tight sealed engagement with a plate 60 recessed in the surface of the plate member 14 remote from the plate member 12. The plate 60 includes a generally hemispherical projection 62 and has a passage 64 formed therethrough communicated with the tubular member 56 at one end and opening centrally through a projection 62 at its other end. The projection 62 is seated within a generally hemispherical recess 65 formed in the side of the plate member 16 adjacent the plate member 14 and the plate member 16 has a passage 66 formed therethrough which opens through the center portion of the recess 65. Thus, the projection 62 and recess 65 form a universal pivot point located between plate members 14 and 16 and within the passage through which coolant is conducted. In addition, an annular sealing washer 68 is secured in an outer portion of the passage 66 and is adapted to form a fluid tight seal between the end of a tubular electrode (not shown) secured to the plate member 16 by the V-block clamp assembly 70 by means of suitable fasteners 72, the adjacent end portion of the tubular electrode being adapted to abut against the annular sealing washer 68 in fluid tight sealed engagement therewith.

The surface of the plate member 14 remote from the plate member 12 has a recess 74 formed therein which is generally L-shaped in plan configuration and in which an L-shaped stabilizing connecting member 76 constructed of resilient material such as spring steel is seated. The L-shaped connecting member 76 includes a pair of elongated leg portions 78 and 80 joined at one pair of corresponding end portions and the free ends of the legs or leg portions 78 and 80 are secured to the plate member 14 by means of suitable fasteners 82. An apex anchor portion of the L-shaped member 76 is secured to the plate member 16 by means of a suitable fastener 84 and thus it may be seen that the plate member 16 may move in a universal manner relative to the plate member 14 but that it is constrained against rotation relative to the plate member 14 about an axis extending generally longitudinally of the tubular member 56 by means of the L-shaped member 76.

The plate member 16 has a pair of bores 86 formed therethrough at points spaced adjacent its periphery and lying upon radii rotated approximately 90° relative to each other. Spring assemblies are mounted in the bores 86 including spring seat members 88 disposed in the bores 86. Suitable fasteners 90 are passed through the spring seats or seat members 88 and threadedly engaged in threaded bores 92 provided therefor in the plate member 14 and compression springs 94 are disposed in the spring seats 88 about the fasteners 90 between the base ends of the seats and retaining washers 96 provided therefor and bearing against the heads of the fasteners 90. Portions of the outer periphery of the plate member 16 diametrically opposite the bores 86 are provided with smooth bores 98 through which tilt adjusting fasteners 100 are passed. The fasteners 100 have the end portions thereof remote from their heads 102 threadedly secured in threaded bores 104 provided therefor in the plate member 14. Thus, it may be seen that the springs 94 serve to urge the corresponding portions of the plate member 16 toward the adjacent portions of the plate member 14 and the fasteners 100 diametrically opposite the springs 94 adjustably hold the adjacent portions of the plate member 16 relative to the plate member 14 against the spring bias by engagement with the underside of plate member 16. Accordingly, the V-block clamp 70 may be laterally displaced along two paths disposed at 90° relative to each other and normal to the longitudinal center axis of the tubular member 56 by adjusting the planar abutment screws 42 and the plate member 16 may be tiltably adjusted relative to the plate member 14 by the tilt abutment members 100.

With attention now invited to FIGURES 4 and 6 of the drawings it may be seen that the portion 24 of the member 12 has a generally radially extending slot 110 formed therein in which the radial innermost end of a metallic locking strip member 112 is secured by means of a suitable fastener 114. The radial outermost end of the member 112 passes through a slot 116 formed in the cylindrical wall portion 18 of the member 14 and the terminal end portion thereof which projects radially outwardly of the member 14 is provided with a longitudinal slot 118. An abutment member 120 is fixedly secured to the member 14 in any convenient manner such as by fasteners 122 and a fastener 124 passes upwardly through the abutment member 120 and the slot 118 and is threadedly engaged in an abutment member 126 disposed above and coacting with the abutment member 120 to clampingly engage the free terminal end portion of the member 112.

As can best be seen from FIGURE 4 of the drawings the member 112 extends along a radius of the member 14 bisecting the radii disposed between the bores of each pair of bores 30 and therefore it may be appreciated that the member 112 may be clamped in position after the member 14 has been adjusted relative to the member 12 in order that the member 14 may be locked in adjusted position.

With attention now invited more specifically to FIGURES 5 and 6 of the drawings it may be seen that a clamp assembly 128 is secured in a recess 130 provided therefor in the undersurface of the member 14 by means of a suitable fastener 132 and that the clamp assembly 128 includes first and second sections 134 and 136 which clampingly secure therebetween one end of a second strip member 138 by means of a fastener 140 secured between the sections 134 and 136. The free end of the strip member 138 projects downwardly through an opening 142 provided therefor in the member 16 and the lower terminal end portion thereof is provided with a slot 144 corresponding to the slot 118. An abutment member 146 is fixedly secured to the member 16 by means of suitable fasteners 148 and a second abutment member 150 is secured to the abutment member 146 by means of a suitable fastener 152. The second abutment member 150 is disposed outwardly of and coacts with the abutment member 146 to clampingly anchor the lower end portion of the strip member 138, by means of the fastener 152 passing through the slot 144 between the abutment members 146 and 150.

With attention now directed more specifically to FIGURES 8 and 10 of the drawings there will be seen a modified form of chuck generally referred to by the reference numeral 10' and which is substantially identical to the chuck 10 except that the third member 16' thereof corresponding to the member 16 includes a downwardly projecting central neck portion 67 through which the passage 66' corresponding to the passage 66 extends. In addition, the member 16' is adapted to have a conventional Jacob's chuck assembly generally referred to by the reference numeral 70' removably secured thereto by means of suitable fasteners 72' in lieu of the V-block clamp assembly 70 utilized on the chuck 10. Otherwise, the chuck 10' is substantially identical to the chuck 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrode chuck including first, second and third members disposed in sequential aligned position along a center axis defined by said members, said first member including means adapted for securement to an electrical discharge machine, said third member including means adapted to support tubular electrode means therefrom for rotation about an axis generally paralleling and closely adjacent said center axis, one pair of the adjacent members including means supporting said one pair of members from each other for relative movement along paths disposed generally at right angles to each other and generally in the same plane substantially normal to said center axis, means connected between said one pair of members operative to retain the latter in adjusted positions, another pair of said members including means supporting said other pair of members from each other for relative universal movement about a point at least closely adjacent said center axis, means connected between said other pair of members operative to retain the latter in adjusted relative positions, said first, second and third members including passage means extending therethrough generally along said center axis defining a closed passage extending through said members and including means at one end opening through said first member adapted for fluid tight sealed engagement with a fluid passage opening outwardly of said machine and means at the other end opening through said third member adapted for fluid tight sealed engagement with one end of said tubular electrode means, said passage means including generally aligned passages formed through said members, one member of said other pair of members including a hemispherical projection and the other member of said other pair of members including a hemispherical recess in which said projecton is seatingly disposed, the adjacent ends of said passages in said other pair of members opening centrally through the mating surfaces of said projection and recess, said projection and recess comprising the means by which said third member is supported from said second member for universal movement relative to said second member, and an elongated flexible tubular member having one end portion sealed relative to the passage in one member of said one pair of members and the other end portion sealed relative to the passage in the other member of said one pair of members.

2. In a device for positioning an electrode or the like adapted to be advanced along a feed axis, a mounting member, an adjustment assembly carried by the mounting member and a swivel plate member to which the electrode is adapted to be secured, universal pivot means mounted by the adjustment assembly establishing a pivot point for the swivel plate member, abutment means mounted by the adjustment assembly for engagement with the swivel plate member in axially space relation to the pivot point and stabilizing means connected between the adjustment assembly and the swivel plate member for preventing relative angular displacement about said pivot point in said plane perpendicular to the feed axis, said stabilizing means including a flexible connecting element having an anchor portion secured to the swivel plate member and end portions angularly spaced from the anchor portion by substantially ninety degrees, said end portions being connected to the adjustment assembly.

3. The combination of claim 2 including means mounted by the adjustment assembly for slidably adjusting the same in directions parallel to said plane relative to the mounting member.

4. The combination of claim 3 wherein said adjustment assembly includes a slide plate member from which the pivot means and the abutment means axially project and an annular ring portion surrounding the mounting member from which the slidable adjusting means radially project.

5. The combination of claim 3 including flexible conduit means interconnecting the mounting member and the univeral pivot means for conducting coolant to the swivel plate member.

6. The combination of claim 5 wherein said adjustment assembly includes a slide plate member from which the pivot means and the abutment means axially project and an annular ring portion surrounding the mounting member from which the slidable adjusting means radially project.

7. The combination of claim 2 wherein said adjustment assembly includes a slide plate member from which the pivot means and the abutment means axially project and an annular ring portion surrounding the mounting member from which the slidable adjusting means radially project.

8. The combination of claim 2 including flexible conduit means interconnecting the mounting member and the universal pivot means for conducting coolant to the swivel plate member.

9. The combination of claim 8 wherein said adjustment assembly includes a slide plate member from which the pivot means and the abutment means axially project and an annular ring portion surrounding the mounting member from which the slidable adjusting means radially project.

10. In a device for positioning an electrode or the like adapted to be advanced along a feed axis, a mounting member, an adjustment assembly carried by the mounting member and a swivel plate member to which the electrode is adapted to be secured, universal pivot means mounted by the adjustment assembly establishing a pivot point for the swivel plate member, abutment means mounted by the adjustment assembly for engagement with the swivel plate member in axially spaced relation to the pivot point and means mounted by the adjustment assembly for slidably adjusting the same in directions parallel to a plane perpendicular to the feed axis relative to the mounting member, said adjustment assembly including a slide plate member from which the pivot means and the abutment means axially project having an annular ring portion surrounding the mounting member from which the slidable adjusting means radially project.

11. The combination of claim 10 including stabilizing means connected between the slide plate member and the swivel plate member for preventing relative angular displacement about said pivot point in said plane perpendicular to the feed axis.

12. The combination of claim 10 including flexible conduit means interconnecting the mounting member and the universal pivot means for conducting coolant to the swivel plate member.

References Cited

UNITED STATES PATENTS

| | | |
|---|---|---|
| 1,723,356 | 8/1929 | Knowles. |
| 2,276,945 | 3/1942 | Ehrich _____ 279—6 |
| 2,718,581 | 9/1955 | Thomas. |
| 2,833,544 | 5/1958 | Blades _____ 279—6 |
| 2,922,022 | 1/1960 | Mironoff. |

JOSEPH V. TRUHE, Primary Examiner

R. F. STAUBLY, Assistant Examiner

U.S. Cl. X.R.

204—143; 279—6